US006906531B2

(12) United States Patent
Mobley

(10) Patent No.: US 6,906,531 B2
(45) Date of Patent: Jun. 14, 2005

(54) ADAPTIVE REFERENCE VOLTAGE METHOD AND SYSTEM

(75) Inventor: James B. Mobley, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 10/269,355

(22) Filed: Oct. 11, 2002

(65) Prior Publication Data

US 2004/0070409 A1 Apr. 15, 2004

(51) Int. Cl.[7] .............................................. G01R 27/26
(52) U.S. Cl. ...................................... 324/672; 324/613
(58) Field of Search ................................ 324/606, 613, 324/713, 672; 323/283; 327/376; 341/118; 375/257

(56) References Cited

U.S. PATENT DOCUMENTS

| | | | | |
|---|---|---|---|---|
| 5,436,584 A | * | 7/1995 | Bodas et al. ................. | 327/310 |
| 5,808,490 A | * | 9/1998 | Watanabe ..................... | 327/94 |
| 6,124,732 A | | 9/2000 | Zilic et al. ..................... | 326/63 |
| 6,201,431 B1 | * | 3/2001 | Allen et al. .................. | 327/379 |
| 6,211,701 B1 | | 4/2001 | Kuijk et al. ................... | 326/83 |
| 6,281,826 B1 | | 8/2001 | Kimura ....................... | 341/150 |
| 6,344,758 B1 | | 2/2002 | Turner et al. ................. | 326/86 |
| RE37,593 E | | 3/2002 | Etoh et al. ............. | 365/189.09 |
| 6,393,577 B1 | | 5/2002 | Akamatsu et al. .......... | 713/600 |
| 6,453,422 B1 | * | 9/2002 | Dabral et al. ............... | 713/300 |
| 6,459,400 B1 | | 10/2002 | Steinbach ................... | 341/156 |
| 6,529,422 B1 | * | 3/2003 | Mazumder et al. ..... | 365/189.09 |

\* cited by examiner

*Primary Examiner*—Anjan Deb
*Assistant Examiner*—Walter Benson
(74) *Attorney, Agent, or Firm*—Hamilton & Terrile, LLP; Robert W. Holland

(57) ABSTRACT

An adaptive reference voltage method and system analyzes a received bus signal to evaluate voltage swing characteristics and adjusts the reference voltage for reading the signal to a level that compensates for variations in margins between high and low signal switching values such as are introduced by noise. A bus input signal analyzer circuit incorporated in an integrated circuit analyzes the bus signal received at the integrated circuit to adjust the reference voltage used by the integrated circuit. In one embodiment, the bus input signal analyzer circuit applies a feedback loop to adapt the reference voltage by setting high and low input values to a reference voltage generation circuit with the reference voltage centered between the high and low values, such as results from a resistor divider network.

14 Claims, 3 Drawing Sheets

ADAPTIVE REFERENCE VOLTAGE METHOD AND SYSTEM

BACKGROUND OF THE INVENTION

1. Field of the Invention

The present invention relates in general to the field of signal processing, and more particularly to a method and system for adapting a reference voltage.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include several integrated circuits installed in a motherboard that communicate data over high speed buses. High speed buses have increasingly relied on input comparator methods to determine whether a signal on a bus is high or low. Typically, each integrated circuit that uses the input comparator method receives a reference voltage generated by a circuit on the motherboard and compares input signals with the reference voltage to determine if the input signal is high or low. The reference voltage value is typically centered between the designed high and low swings of the input voltage to provide as good as possible of a margin to avoid the introduction of errors due to signal noise. For instance, FIG. 1A depicts a resistor voltage divider network circuit 2 used on a motherboard to generate a reference voltage 3 for signals sent over a bus by a GTL driver circuit 4. GTL driver circuits are typically implemented as open drain devices that pull the bus signal to a low state. In the example of FIG. 1, a termination voltage 5 of 1.5 volts and a termination resistor 6 of 50 ohms interfaced with a GTL driver 7 of 25 ohms will result in voltage swings of between 1.5 and 0.5 volts, making 1.0 volts the best theoretical reference voltage with a 0.5 volt margin from each of the high and low voltage swings, as is depicted by FIG. 1B. Resistor divider voltage circuit 2 establishes the reference voltage between two resistors 8 that divide the termination voltage and ground.

One difficulty with the use of a resistor divider circuit is that it generally requires a best guess of a value for the reference voltage, usually a value that is centered between the designed high and low swings of the bus signal input voltage. Once a design value for the reference voltage is chosen, the value typically remains static as a fixed function of the resistor voltage divider network circuit. However, bus input signals typically include a noise component that results in voltage swings that differ from designed voltage swings. For instance, voltage swing characteristics vary depending on the switching patterns generated by the output drivers that generate the bus signal. Voltage swing characteristics are affected by overshoot, ringback, inter symbol interference (ISI), asymmetric NMOS/PMOS driver strength, motherboard impedance and other process variations. These factors typically shift high and low voltage swings from designed values causing some transitions to experience reduced margins when the reference voltage is no longer located between high and low voltage values.

SUMMARY OF THE INVENTION

Therefore a need has arisen for a method and system which determines an optimal reference voltage value used to measure whether a bus signal is high or low based on actual bus signal voltage swing characteristics.

A further need exists for a method and system which dynamically adjusts a reference voltage in response to changes in bus input signal characteristics to compensate for high and low noise margins.

In accordance with the present invention, a method and system are provided which substantially reduce the disadvantages and problems associated with previous methods and systems for establishing a reference voltage value for determining whether a bus signal is high or low. The bus signal is analyzed to evaluate noise, such as variations in voltage swing characteristics, and the reference voltage is dynamically adjusted based on the bus signal analysis to compensate for the bus signal noise. For instance, a value centered between measured high and low voltage swings is determined and used as the reference voltage value resulting in equal high and low noise margins.

More specifically, a reference voltage generator outputs a dynamically adjusted reference voltage value based on low and high voltage inputs and an integrated circuit uses the reference value to measure a bus signal value. A bus input signal analyzer circuit compares bus input signal voltage swing characteristics with the low and high voltage inputs and the reference voltage output to determine low and high voltage offset signals. A low voltage input generator circuit generates the low voltage input from a low voltage reference value and the low voltage offset signal. A high voltage input generator circuit generates the high voltage input from a high voltage reference value and the high voltage offset signal. Changes in voltage swing characteristics are thus detected and used by a feedback loop to dynamically adapt the reference voltage to achieve symmetric high and low noise margins. For instance, the reference voltage generator is a resistor voltage divider network circuit that outputs a dynamically adjusted reference voltage based on changes to high and low input voltage values. The value of the high and low voltage inputs change based on analysis of the bus input signal voltage swing characteristics.

The present invention provides a number of important technical advantages. One example of an important technical advantage is that an optimal reference voltage value is determined for use in measuring whether a bus signal is high or low based on actual bus signal voltage swing characteristics. Thus, rather than setting a reference voltage based on theoretical signal voltage swing characteristics for all such buses, each integrated circuit sets its own reference voltage based on the quality of the input signal received at the integrated circuit. The more precise setting of a reference voltage gives greater margin for determining bus signal values. Further, the present invention provides increased margin with reduced complexity of motherboard layout since the circuitry for dynamically adjusting the reference voltage for an integrated circuit may be incorporated completely or in part within that integrated circuit.

Another example of an important technical advantage of the present invention is that a reference voltage dynamically adjusts as bus input signal characteristics change in order to compensate for high and low noise margins that change over time. Bus input signals are analyzed over time with a feedback loop that sets high and low value inputs for a resistor divider circuit. As voltage swing characteristics drift to different ranges, reference voltage is dynamically adjusted to remain centered in the voltage swing. The reaction time of the feedback loop is set to rapidly compensate for changes in voltage signal swing characteristics without over reacting to transient changes in signal characteristics. The availability of an adaptive reference voltage reduces the impact of noise on information handling system operations and thus the need for shielding and other noise reduction measures.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Accurate data transfer over information handling system buses is hampered by noise that effects bus signal swing characteristics. The present invention analyzes a bus signal input to a destination, such as an integrated circuit, and dynamically adjusts the reference voltage to compensate for degraded information handling system bus signal quality. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1B:
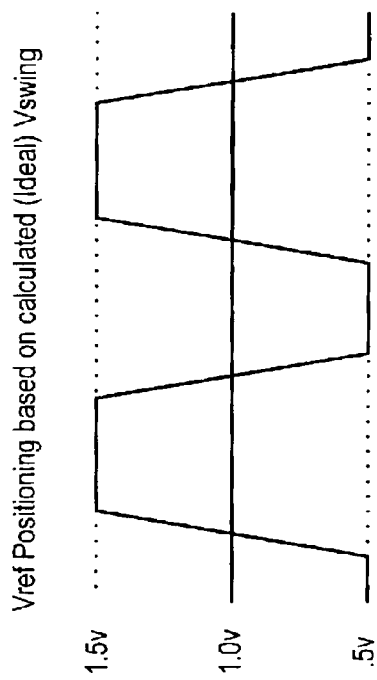
FIG. 1B depicts a bus signal with theoretically equal margins.
Figure 1A:
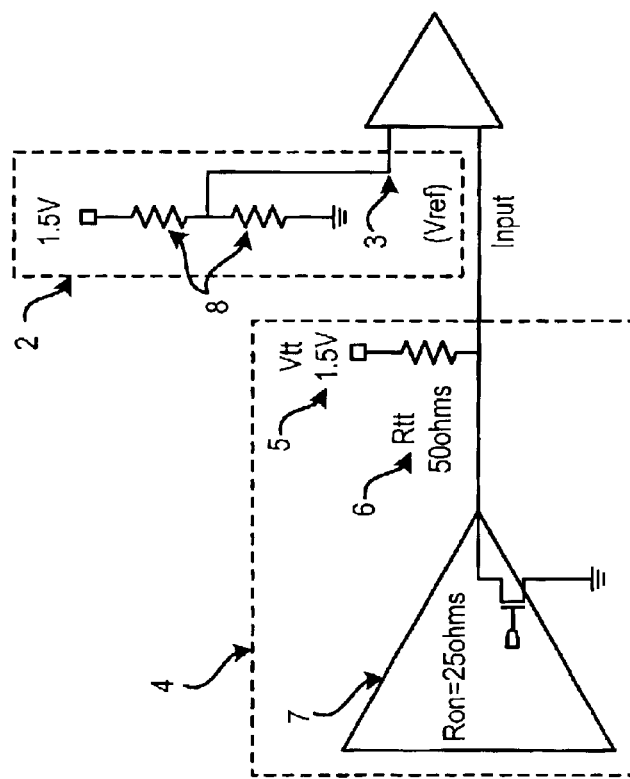
FIG. 1A depicts a circuit diagram of a prior art resistor divider network that generates a fixed reference voltage.
Figure 2:
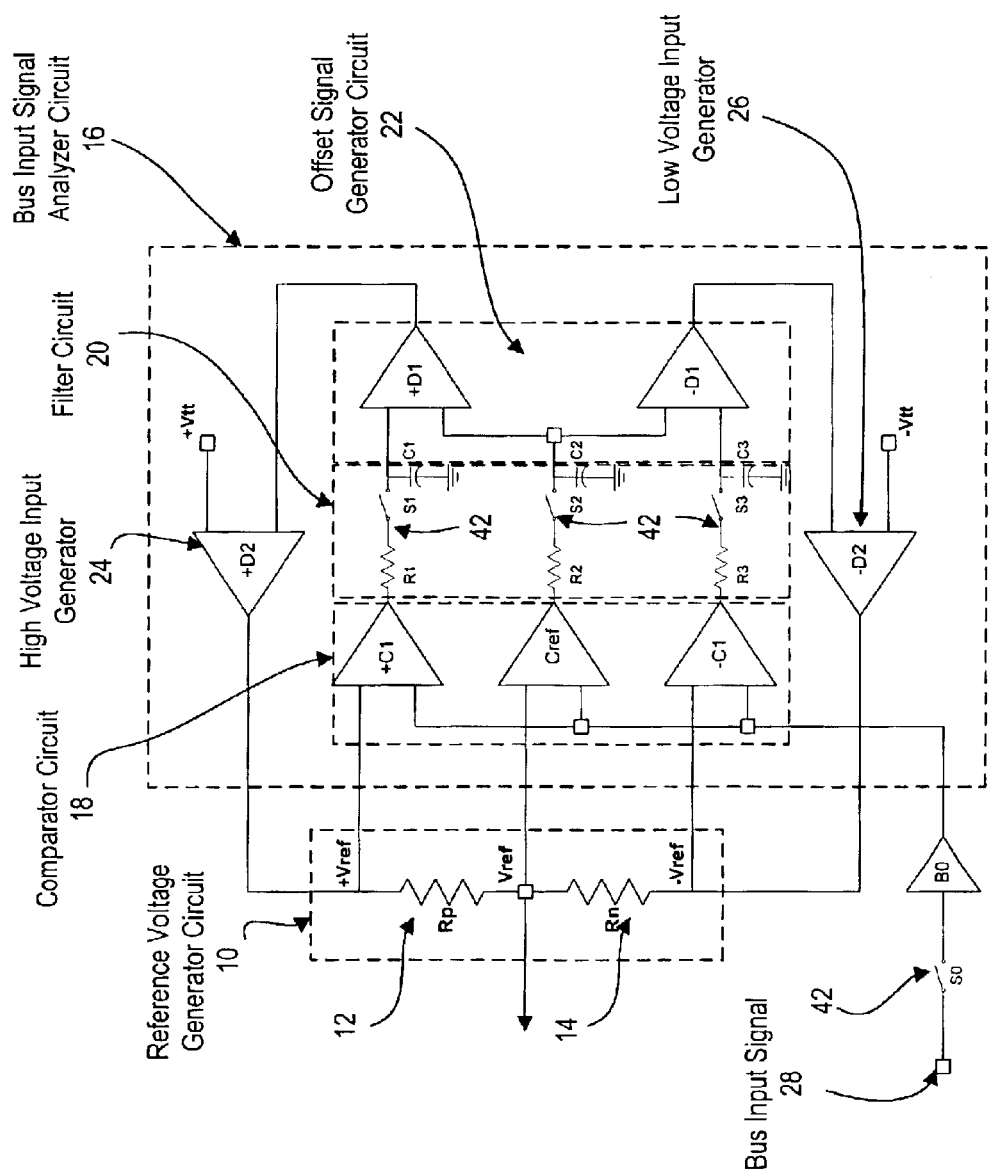
FIG. 2 depicts a circuit diagram of a dynamically adapting reference voltage generator.

Referring now to FIG. 2, a circuit diagram depicts a system for adapting a reference voltage signal used by an integrated circuit to determine if a bus input signal is high or low, such as an integrated circuit that uses an input comparator method to read a bus input signal. A reference voltage annotated $V_{REF}$ is output for use by the integrated circuit from a reference voltage generator circuit 10. Reference voltage generator circuit 10 is a resistor voltage divider network except that, rather than using static voltage inputs such as $V_{CC}$ and ground to output a static reference voltage, reference generator circuit 10 uses dynamic voltage inputs that result in the output of a dynamic reference voltage. A high voltage input annotated $+V_{REF}$ is input to a resistor 12 annotated RP and a low voltage input annotated $-VREF$ is input to a resistor 14 annotated RN, with the reference voltage resulting from interaction of the high and low inputs with the resistors. In alternative embodiments, alternative circuits for generating reference voltages may be used, such as by adjusting the reference voltage with adjustments to only one of the high or low voltage inputs.

The reference voltage adapts to a value centered between high and low voltage swings which vary from theoretical values due to changes in waveform signal quality. The reference voltage value results from the high and low input values which are dynamically adjusted by a bus input signal analyzer circuit 16. Bus input analyzer circuit 16 analyzes the bus input signal 28 to evaluate bus signal quality and outputs high and low voltage inputs to reference voltage generator circuit 10 that result in a reference voltage that compensates for bus signal quality. Bus input signal analyzer circuit 16 establishes a feedback loop that compares the bus input signal with the high, low and reference voltage signals in a comparator circuit 18, filters the compared signals in a filter circuit 20 and generates high and low offset signals in an offset signal generator circuit 22. The high offset signal is input to a high voltage input generator 24 where it is combined with a high reference voltage annotated $+V_{tt}$ to output the high voltage input to reference voltage generator circuit 10. The low offset signal is input to a low voltage input generator 26 where it is combined with a low reference voltage annotated $-V_{tt}$ to output the low voltage input to reference voltage generator circuit 10.

Comparator circuit 18 includes three comparators, $+C_1$, $C_{REF}$, and $-C_1$, that compare the bus input signal 28 with each of the high and low voltage inputs of reference voltage generator circuit 10 and the reference voltage output of reference voltage generator circuit 10. The results of the comparisons are AC values of the same bus input signal crossing different voltage thresholds effectively creating different duty cycles between the reference voltage, high voltage input and low voltage input values. The AC values that result from the comparison of the AC bus input signal and the DC high input, low input and reference voltage signals are then provided to filter circuit 20 for filtering to DC values which results in an averaging based on the differing duty cycles. In the embodiment illustrated by FIG. 2, filter circuit 20 uses a RC network for each of the comparator outputs and provides the filtered DC values to offset signal generator 22. Offset signal generator 22 includes a differential amplifier for each of the high and low offset values that are generated. Differential amplifier $+D_1$ outputs a high voltage offset signal that results from the difference of the filtered outputs from comparator $+C_1$ and $C_{REF}$, and differential amplifier $-D_1$ outputs a low voltage offset signal that results from difference of the filtered outputs from comparator $-C_1$ and $C_{REF}$. High voltage input generator 24 and low voltage generator 26 are differential amplifiers, respectively annotated $+D_2$ and $-D_1$, that output high and low input values generated from the difference of the offset and the high or low reference value, $+V_{tt}$ or $-V_{tt}$.

Figure 3A:
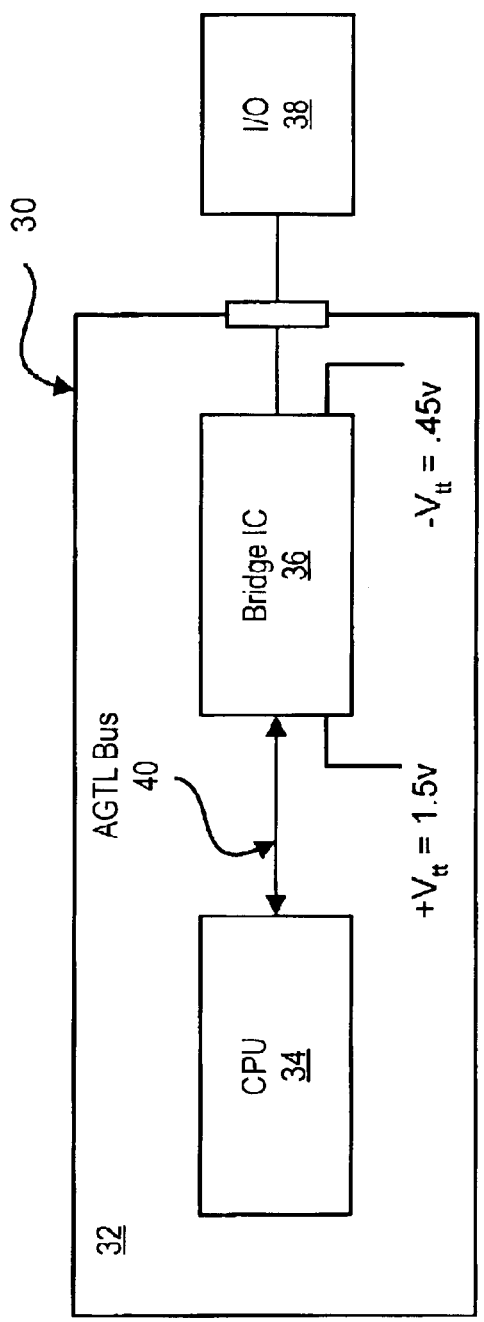
FIGS. 3A and 3B depict an information handling system bus and associated bus signal with a reference voltage that adapts to swing characteristics of the bus signal.

In operation, an adaptive reference voltage is established by integrating bus input signal analyzer circuit 16 and reference voltage generator circuit 10 within an integrated circuit to establish an adaptive reference voltage for use by the integrated circuit for reading bus signals received at the integrated circuit. Referring now to FIG. 3A, a simplified block diagram of an information handling system 30 depicts a motherboard 32 supporting a CPU 34, a bridge integrated circuit 36 and an input/output device 38. An AGTL bus 40 communicates information between CPU 34 and bridge integrated circuit 36, which incorporates bus input signal analyzer 16 and reference voltage generator 10. In an alternative embodiment, reference voltage generator 10 may be separated from bridge integrated circuit 36 as a separate circuit supported by motherboard 32. In such an alternative embodiment, reference voltage generator 10 communicates reference voltage, high voltage inputs and low voltage inputs through integrated circuit pins.

Figure 3B:
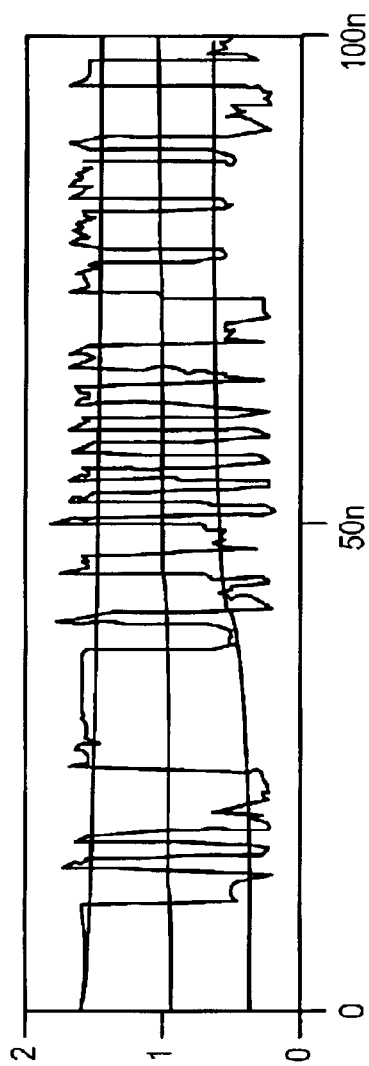

Referring now to FIG. 3B, an example of bus signal sent from CPU 34 to bridge integrated circuit 36 is depicted with the reference voltage adapting to an initial value centered between theoretical high and low voltage swings to an adaptive value centered between analyzed high and low voltage swings. The example AGTL bus signal switches at a 400 Mhz fundamental frequency using a pseudo-random pulse train with non-reflective signal swing between 1.5 and 0.45 volts. The theoretical reference voltage for the bus input signal of FIG. 3B is 0.975 volts ((1.5+0.45)/2) with a margin of 0.525 volts on either side of the reference voltage in an ideal switching situation. However, noise, such as ISI generated signal reflections, results in signal swings between 1.5 volts and 0.7 volts, thus providing only a 0.275 volts low side margin for the theoretical reference voltage of 0.975 volts.

Initially, reference voltage generator 10 for bridge integrated circuit 36 receives a high volt input $+V_{tt}$ of 1.5 volts and low volt input $-V_{tt}$ of 0.45 volts since no offset is provided to high voltage input generator 24 and low voltage input generator 26. The $+V_{tt}$ and $-V_{tt}$ values are initially set at the settling voltages, meaning the driven high and low state values attained at the receiving integrated circuit after all signal reflections have settled out, in order to avoid introduction of bias to the feedback loop. The reference voltage of 0.975 volts results from these inputs and is provided to comparator circuit 18 along with the high and low input values and bus input signal 28. Comparator circuit 18, filter circuit 20 and offset signal generator circuit 22 work over time to analyze the bus input signal values relative to the position of the reference voltage and build offsets to adjust the high and low voltage inputs to the reference voltage generator circuit.

In FIG. 3B, the reference voltage increases by approximately 60 millivolts over a 100 ns time span to a value closer to the 1.1 volt optimal reference voltage ((1.5+0.7)/2). An equal 0.4 volts margin is then provided between worst case signal swings of 1.5 and 0.7 volts. FIG. 3B illustrates that the high and low input values to reference voltage generator 10 are driven towards each other until the feedback loop reaches equilibrium at which point the reference voltage falls equal distance between the high and low input values. The amount of offset signal for the high and low inputs and the rate of change of the reference voltage are selectable by limit and gain variables for the amplifiers and by adjusting the responsiveness of the RC circuit in filter circuit 20 with different capacitance and resistance settings. Alternatively, the reference voltage may be periodically determined with a calibration process that latches the reference voltage as a steady state subject to re-calibrations to adjust for temperature and voltage shifts over time. For instance, switches 42 depicted in FIG. 2 enable a sample and hold technique where the capacitors of filter circuit 20 are adequate to overcome leakage currents over a finite time period. Opening the switches also allows storing of a reference voltage where an I/O application calls for changing from a receiver of input to a driver of output.

An adaptive reference voltage that compensates for bus signal noise by analyzing bus signals received at an integrated circuit offer improved noise margins for measuring bus signal values as high or low. In addition, greater flexibility in information handling system design is provided with automatic compensation built into integrated circuits for signal reflections and manufacturing variations. A reduced number of motherboard components and traces are needed, allowing simpler and less expensive designs. Further, by applying appropriate bus signal analysis, a wide variety of existing and emerging technologies are supported, including high speed serial links, point to point architectures, and new bus technologies that rely on reduced voltage swings.

Although the present invention has been described in detail, it should be understood that various changes, substitutions and alterations can be made hereto without departing from the spirit and scope of the invention as defined by the appended claims.

What is claimed is:

1. A system for adapting a reference voltage signal used by an integrated circuit to determine if a bus input signal is high or low, the system comprising:

a reference voltage generator circuit having a low voltage input, a high voltage input and a reference voltage output, the reference voltage generator circuit operable to output the reference voltage signal from a low voltage signal received at the low voltage input and a high voltage signal received at the high voltage input;

a bus input signal analyzer circuit interfaced with the bus input signal, the low voltage input, the high voltage input and the reference voltage output, the bus input signal analyzer circuit operable to compare bus input signal voltage swing characteristics with the low voltage, high voltage and reference voltage signals and to output a low voltage offset signal and a high voltage offset signal;

a low voltage input generator circuit interfaced with the reference voltage generator circuit low voltage input and the bus input signal analyzer circuit, the low voltage input generator circuit operable to generate a voltage for the low voltage input from the low voltage offset signal and a low voltage reference signal; and a high voltage input generator circuit interfaced with the reference voltage generator circuit high voltage input and the filter circuit, the high voltage input generator circuit operable to generate a voltage for the high voltage input from the high voltage offset signal and a high voltage reference signal.

2. The system of claim 1 wherein the reference voltage generator circuit comprises a resistor divider network.

3. The system of claim 2 wherein:
   the low voltage generator comprises a differential amplifier that adjusts the low voltage reference signal by the low voltage offset to output the low voltage signal to the resistor divider network low voltage input;
   the high voltage generator comprises a differential amplifier that adjusts the high voltage reference signal by the high voltage offset to output the high voltage signal to the resistor divider network high voltage input; and
   the resistor divider network outputs the reference voltage signal by dividing the low and high voltage inputs approximately in half.

4. The system of claim 3 wherein the high voltage reference signal approximates the expected high voltage of the bus input signal voltage swing characteristics and the low voltage reference signal approximates the expected low voltage of the bus input signal voltage swing characteristics.

5. The system of claim 1 wherein the bus input signal analyzer circuit comprises:
   a comparator circuit operable to compare each of the low voltage input signal, the high voltage input signal and the reference voltage signal with the bus input signal; and
   a filter circuit interfaced with the comparator circuit and operable to average the compared signals; and
   an offset signal generator circuit interfaced with the filter circuit an operable to generate the high voltage offset signal from the comparisons of the high voltage signal and reference signal with the bus input signal, and operable to generate the low voltage offset signal from the comparisons of the low voltage signal and reference signal with the bus input signal.

6. The system of claim 1 wherein the bus input signal analyzer circuit is integrated within the integrated circuit.

7. The system of claim 6 wherein the reference voltage generator circuit resides on an information handling system motherboard.

8. A method for adapting a reference voltage signal used by an integrated circuit to determine if a bus signal is high or low, the method comprising:
   analyzing the bus signal received at the integrated circuit to evaluate bus signal noise; and
   applying the bus signal noise analysis as feedback to dynamically adjust the reference voltage signal to a level that compensates for the bus signal noise.

9. The method of claim 8 wherein:
   analyzing the bus signal further comprises comparing the bus signal voltage swing characteristics with expected bus signal voltage swing characteristics to determine high and low voltage signal values associated with the bus signal; and
   applying the bus noise analysis as feedback to dynamically adjust the reference voltage signal comprises setting the reference signal between the high and low voltage signals to substantially equalize high and low noise margins.

10. The method of claim 9 further comprising:
    setting the reference voltage with a resistor divider network; and
    inputting the high and low voltage signals into the resistor divider network to dynamically adjust the reference voltage.

11. The method of claim 10 wherein determining the high and low voltage signal values further comprises:
    adjusting a high voltage reference signal by a first offset associated with signal noise; and
    adjusting a low voltage reference signal by a second offset associated with signal noise.

12. The method of claim 8 wherein analyzing the bus signal received at the integrated circuit further comprises analyzing the bus signal with circuitry incorporated in the integrated circuit.

13. The method of claim 12 wherein adjusting the reference voltage signal further comprises adjusting the reference voltage signal with circuitry incorporated in the integrated circuit.

14. The method of claim 12 wherein adjusting the reference voltage signal further comprises adjusting the reference voltage signal with circuitry incorporated in an information handling system motherboard.

* * * * *